(12) United States Patent
Miller et al.

(10) Patent No.: US 7,264,878 B2
(45) Date of Patent: *Sep. 4, 2007

(54) LAMINATED CARBON FOAM SANDWICH FOR NAVAL DECKING

(75) Inventors: Douglas J. Miller, North Olmsted, OH (US); Irwin C. Lewis, Strongsville, OH (US); Richard L. Shao, North Royalton, OH (US)

(73) Assignee: UCAR Carbon Company Inc., Parma, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/367,776

(22) Filed: Mar. 3, 2006

(65) Prior Publication Data

US 2007/0141344 A1 Jun. 21, 2007

Related U.S. Application Data

(63) Continuation-in-part of application No. 10/970,352, filed on Oct. 21, 2004.

(51) Int. Cl.
B32B 9/00 (2006.01)
(52) U.S. Cl. .................... 428/408; 423/445 R
(58) Field of Classification Search ............... 428/408; 423/445 R; 427/249.1
See application file for complete search history.

(56) References Cited

U.S. PATENT DOCUMENTS

| | | | |
|---|---|---|---|
| 3,302,399 A | 2/1967 | Tini et al. .................... 60/39.7 |
| 3,302,909 A | 2/1967 | Glassman ..................... 248/44 |
| 3,309,437 A | 3/1967 | Harnett ........................ 264/29 |
| 3,387,940 A | 6/1968 | McHenry et al. .......... 23/209.2 |
| 3,632,385 A | 1/1972 | Schmitt et al. ............... 117/46 |
| RE28,574 E | 10/1975 | Ruoff .......................... 425/78 |
| 3,960,761 A | 6/1976 | Burger et al. ............... 252/421 |
| 4,190,637 A | 2/1980 | Kennedy .................... 423/448 |
| 4,276,246 A * | 6/1981 | Bonzom et al. .............. 264/53 |
| 4,619,796 A | 10/1986 | Awata et al. ............... 264/29.4 |
| 4,681,718 A | 7/1987 | Oldham ...................... 264/102 |
| 4,851,280 A | 7/1989 | Gupta ........................ 428/246 |
| 4,879,182 A | 11/1989 | Presswood et al. ......... 428/408 |
| 4,966,919 A | 10/1990 | Williams, Jr. et al. ........ 521/54 |
| 4,992,254 A | 2/1991 | Kong ......................... 423/449 |
| 5,047,225 A | 9/1991 | Kong ...................... 423/447.2 |
| 5,211,786 A | 5/1993 | Enloe et al. .................. 156/89 |
| 5,282,734 A | 2/1994 | Pastureau et al. .......... 425/393 |
| 5,589,015 A * | 12/1996 | Fusco et al. ............... 156/73.1 |
| 5,648,027 A | 7/1997 | Tajiri et al. ................... 264/43 |
| 5,686,038 A | 11/1997 | Christensen et al. ........ 264/257 |
| 5,709,893 A | 1/1998 | McCarville et al. ........ 425/389 |
| 5,730,915 A | 3/1998 | Cornie ...................... 264/29.1 |

(Continued)

OTHER PUBLICATIONS

Touchstone Research Laboratory, Ltd., Product Data Sheet: CFOAM Carbon Foams, Rev8-0803.

(Continued)

*Primary Examiner*—Jennifer McNeil
*Assistant Examiner*—Daniel Miller
(74) *Attorney, Agent, or Firm*—Waddey & Patterson; James R. Cartiglia

(57) ABSTRACT

A laminate sandwich structure useful for, inter alia, decking for naval vessels, which includes a core formed of carbon foam having a ratio of compressive strength to density of at least about 7000 psi/g/cc.

24 Claims, 1 Drawing Sheet

U.S. PATENT DOCUMENTS

| | | | | |
|---|---|---|---|---|
| 5,868,974 | A | 2/1999 | Kearns | 264/29.6 |
| 5,888,469 | A | 3/1999 | Stiller et al. | 423/445 |
| 5,888,649 | A | 3/1999 | Curatolo et al. | 428/352 |
| 5,937,932 | A | 8/1999 | Cornie | 164/526 |
| 5,945,084 | A | 8/1999 | Droege | 423/447.4 |
| 5,961,814 | A | 10/1999 | Kearns | 208/39 |
| 5,984,256 | A | 11/1999 | Endo | 249/114.1 |
| 6,024,555 | A | 2/2000 | Goodridge et al. | 425/394 |
| 6,033,506 | A | 3/2000 | Klett | 156/78 |
| 6,093,245 | A | 7/2000 | Hammond et al. | 117/200 |
| 6,099,792 | A | 8/2000 | Ganguli et al. | 264/621 |
| 6,103,149 | A | 8/2000 | Stankiewicz | 264/29.1 |
| 6,183,854 | B1 | 2/2001 | Stiller et al. | 428/312.2 |
| 6,217,800 | B1 | 4/2001 | Hayward | 264/29.1 |
| 6,241,957 | B1 | 6/2001 | Stiller et al. | 423/448 |
| 6,291,049 | B1 | 9/2001 | Kunkel et al. | 428/99 |
| 6,344,159 | B1 | 2/2002 | Klett | 264/29.7 |
| 6,346,226 | B1 | 2/2002 | Stiller et al. | 423/448 |
| 6,387,343 | B1 | 5/2002 | Klett | 423/448 |
| 6,399,149 | B1 | 6/2002 | Klett et al. | 427/230 |
| 6,506,354 | B1 | 1/2003 | Stiller et al. | 423/445 |
| 6,576,168 | B2 | 6/2003 | Hardcastle et al. | 264/29.1 |
| 6,656,238 | B1 | 12/2003 | Rogers et al. | 44/620 |
| 6,776,936 | B2 | 8/2004 | Hardcastle et al. | 264/29.1 |
| 6,849,098 | B1 | 2/2005 | Joseph et al. | 44/620 |
| 6,861,151 | B1 * | 3/2005 | Rogers et al. | 428/489 |
| 2002/0190414 | A1 | 12/2002 | Hardcastle et al. | |
| 2006/0014908 | A1 | 1/2006 | Rotermund et al. | |

OTHER PUBLICATIONS

ORNL High Thermal Conductivity Graphite Foams.

Carbon Graphite Foams at MER Corporation.

POCO Graphite Foam, Properties and Characteristics, Jun. 29, 2001.

Article in High-Performance Composites, Sep. 2004, p. 25.

Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, pp. 206, 207.

Preparation and Graphitization of High-Performance Carbon Foams From Coal, Rogers, et al., Touchstone Research Laboratory, Ltd.

Low-Cost Carbon Foams for Thermal Protection and Reinforcement Applications; Rogers, et al., Touchstone Research Laboratory, pp. 293-305.

Coal-Based Carbon Foam for High Temperature Applications, Dwayne R. Morgan, Touchstone Research Laboratory, Inc.

Precursor Effects on Graphite Foams, Cooling Power Electronics Using Graphite Foams, ORNL Carbon and Graphite Foams.

High Thermal Conductivity, Mesophase Pitch-Derived Carbon Foam, 43rd International SAMPE Symposium, May 31-Jun. 4, 1998, pp. 745, 746.

Microcellular Pitch-Based Carbon Foams Blown with Helium Gas, Anderson, et al., 43rd International SAMPE Symposium, May 31-Jun. 4, 1998, pp. 756, 758, and 760.

High Thermal Conductivity Graphite Foam—Progress and Opportunities, Wiechmann, et al., Composite Optics, Inc.

Performance of Alternate Precursors for Graphite Foam, James Klett and Claudia Walls, Oak Ridge National Laboratory.

Japanese article Structural and thermal characteristics of highly graphitizable AR-Foam by Fumitaka Watanabe and Isao Mochida.

GB-263—Advanced Structural Carbons: Fibers, Foams and Composites, pp. 43-51.

Characterization Requirements for Aerospace Thermal Management Applications, Brow, et al.

Aztex X-Cor, High Performance, Damage Tolerant Composite Core Material, Oct. 2002.

GB Patent Specification 1,489,690, Application No. 28255/75, filed Jul. 4, 1975 titled "Briquatting Coal".

"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.

Kirk-Othmer, Encyclopedia of Chemical Technology, 4th ed., vol. 6, John Wiley & Sons, Application of Coal Petrology and Petrography, pp. 429-434 and 454-455, 1993.

* cited by examiner

LAMINATED CARBON FOAM SANDWICH FOR NAVAL DECKING

RELATED APPLICATION

This application is a continuation-in-part of copending and commonly assigned U.S. application having Ser. No. 10/970,352, filed in the names of Miller, Lewis and Mercuri on Oct. 21, 2004, entitled "High Strength Monolithic Carbon Foam," the disclosure of which is incorporated herein by reference.

BACKGROUND OF THE INVENTION

1. Technical Field

The present invention relates to a laminated high strength monolithic carbon foam material that is especially useful for the production of decking for naval vessels and the like. More particularly, the present invention relates to reinforced carbon foam sandwiched between two composite facesheets, and exhibiting improved strength, weight and density characteristics desired for decking applications. The invention also includes methods for the production of such sandwiches.

2. Background Art

Decking for naval vessels and the like presents unique challenges. While metals such as steel and aluminum have traditionally been used where high strength is desired, the weight of these materials is such that the configuration of the vessels has to be specifically designed with the weight of the decking material in mind. In addition, metallic decking transmits heat and vibration, requiring specialized dampeners and other materials to be employed, at significant cost, and added weight. While composite laminates of for example, foams and wood products, have been suggested for decking applications, a composite having the required strength to weight ratio has not yet been found feasible. Added to this is the fact that laminate sandwiches developed to date are prone to failure through shear stresses—the tendency of the layers to fail laterally along the major surfaces of the sandwich.

Carbon foams have attracted considerable recent activity because of their properties of low density, coupled with either very high or low thermal conductivity. Conventionally, Carbon foams are prepared by two general routes. Highly graphitizable foams have been produced by thermal treatment of mesophase pitches under high pressure. These foams tend to have high thermal and electrical conductivities. For example, in Klett, U.S. Pat. No. 6,033,506, mesophase pitch is heated while subjected to a pressure of 1000 psi to produce an open-cell foam containing interconnected pores with a size range of 90-200 microns. According to.

Klett, after heat treatment to 2800° C., the solid portion of the foam develops into a highly crystalline graphitic structure with an interlayer spacing of 0.366 nm. The foam is asserted to have compressive strengths greater than previous foams (3.4 MPa or 500 psi for a density of 0.53 gm/cc).

In Hardcastle et al. (U.S. Pat. No. 6,776,936) carbon foams with densities ranging from 0.678-1.5 gm/cc are produced by heating pitch in a mold at pressures up to 800 psi. The foam is alleged to be highly graphitizable and provide high thermal conductivity (250 W/m° K).

According to H. J. Anderson et al. in Proceedings of the 43d International SAMPE Meeting, p 756 (1998), carbon foam is produced from mesophase pitch followed by oxidative thermosetting and carbonization to 900° C. The foam has an open cell structure of interconnected pores with varying shapes and with pore diameters ranging from 39 to greater than 480 microns.

Rogers et al., in Proceedings of the 45$^{th}$ SAMPE Conference, pg 293 (2000), describe the preparation of carbon foams from coal-based precursors by heat treatment under high pressure to give materials with densities of 0.35-0.45 g/cc with compressive strengths of 2000-3000 psi (thus a strength/density ratio of about 6000 psi/g/cc). These foams have an open-celled structure of interconnected pores with pore sizes ranging up to 1000 microns. Unlike the mesophase pitch foams described above, they are not highly graphitizable. In a recent publication, the properties of this type of foam were described (High Performance Composites September 2004, pg. 25). The foam has a compressive strength of 800 psi at a density of 0.27 g/cc or a strength to density ratio of 3000 psi/g/cc.

Stiller et al. (U.S. Pat. No. 5,888,469) describes production of carbon foam by pressure heat treatment of a hydrotreated coal extract. These materials are claimed to have high compressive strengths of 600 psi for densities of 0.2-0.4 gm/cc (strength/density ratio of from 1500-3000 psi/g/cc). It is suggested that these foams are stronger than those having a glassy carbon or vitreous nature which are not graphitizable.

Carbon foams can also be produced by direct carbonization of polymers or polymer precursor blends. Mitchell, in U.S. Pat. No. 3,302,999, discusses preparing carbon foams by heating a polyurethane polymer foam at 200-255° C. in air followed by carbonization in an inert atmosphere at 900° C. These foams have densities of 0.085-0.387 g/cc and compressive strengths of 130 to 2040 psi (ratio of strength/density of 1529-5271 psi/g/cc).

In U.S. Pat. No. 5,945,084, Droege described the preparation of open-celled carbon foams by heat treating organic gels derived from hydroxylated benzenes and aldehydes (phenolic resin precursors). The foams have densities of 0.3-0.9 g/cc and are composed of small mesopores with a size range of 2 to 50 nm.

Mercuri et al. (Proceedings of the 9$^{th}$ Carbon Conference, pg. 206 (1969) prepared carbon foams by pyrolysis of phenolic resins. For foams with a density range of 0.1-0.4 gm/cc, the compressive strength to density ratios were from 2380-6611 psi/g/cc. The pores were ellipsoidal in shape with pore diameters of 25-75 microns) for a carbon foam with a density of 0.25 gm/cc.

Stankiewicz (U.S. Pat. No. 6,103,149) prepares carbon foams with a controlled aspect ratio of 0.6-1.2. The patentee points out that users often require a completely isotropic foam for superior properties with an aspect ratio of 1.0 being ideal. An open-celled carbon foam is produced by impregnation of a polyurethane foam with a carbonizing resin followed by thermal curing and carbonization. The pore aspect ratio of the original polyurethane foam is thus changed from 1.3-1.4 to 0.6-1.2.

Unfortunately, carbon foams produced by the prior art processes are not effective for many high strength applications, such as naval decking, where high strength must be balanced with the need for light weight. In other words, decking, especially for an application such as a naval vessel, needs to be strong enough to withstand the weight to be applied to the decking, whether it is due to people aboard ship or equipment installed on the decking. At the same time, the decking must be lighter weight than steel or aluminum, the materials being replaced in such applications, in order to be considered worthwhile. The foams generally available are not monolithic and do not have the strength and strength to density requirements for such application. In addition, open-celled foams with highly interconnected pores have porosities making them ill-placed for such applications.

In U.S. Pat. No. 6,291,049, a foam core laminate is disclosed, having a core with opposing top and bottom surfaces; a plurality of discrete pins disposed through the core and extending beyond the top and bottom surfaces of the core; a face sheet on the top core surface; and a face sheet on the bottom core surface, the ends of each pin bent over and lying between the respective core surfaces and the facesheets. However, although useful for many applications, the resulting sandwich does not have the strength and weight characteristics needed for naval decking.

What is desired, therefore, is a laminate sandwich containing a carbon foam, where the cell structure, strength, strength to density ratio and resistance to shear stresses make the laminate suitable for use as decking for naval vessels as well as in other applications. Indeed, a combination of characteristics, including strength to density ratios and resistance to shear stress higher than contemplated in the prior art, have been found to be necessary for use of a carbon foam in decking applications. Also desired is a process for preparing such laminate sandwiches.

SUMMARY OF THE INVENTION

The present invention provides a carbon foam laminate sandwich which is uniquely capable of use in applications such as for naval vessel decking. The inventive sandwich exhibits a density, compressive strength, compressive strength to density ratio and resistance to delamination to provide a combination of strength, resistance to shear stresses and relatively light weight characteristics not heretofore seen. In addition, the monolithic nature and bimodal cell structure of the foam used in the laminate, with a combination of larger and smaller pores, which are relatively spherical, provide a product which can be produced in a desired size and configuration.

More particularly, the carbon foam employed in the laminate sandwich of the present invention has a density of about 0.05 to about 0.4 grams per cubic centimeter (g/cc), with a compressive strength of at least about 2000 pounds per square inch (psi) (measured by, for instance, ASTM C695). An important characteristic for the foam when intended for use in decking applications is the ratio of strength to density. For such applications, a ratio of strength to density of at least about 7000 psi/g/cc is required, more preferably at least about 8000 psi/g/cc.

The carbon foam should have a relatively uniform distribution of pores in order to provide the required high compressive strength. In addition, the pores should be relatively isotropic, by which is meant that the pores are relatively spherical, meaning that the pores have, on average, an aspect ratio of between about 1.0 (which represents a perfect spherical geometry) and about 1.5. The aspect ratio is determined by dividing the longer dimension of any pore with its shorter dimension.

The foam should have a total porosity of about 65% to about 95%, more preferably about 70% to about 95%. In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the inventive carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the foams useful in the present invention provides an intermediate structure between open-celled foams and closed-cell foams, thus limiting the liquid permeability of the foam while maintaining a foam structure. Indeed, advantageously, the carbon foams useful in the present invention should exhibit a permeability of no greater than about 3.0 darcys, more preferably no greater than about 2.0 darcys (as measured, for instance, by ASTM C577).

Advantageously, to produce suitable foams, a polymeric foam block, particularly a phenolic foam block, is carbonized in an inert or air-excluded atmosphere, at temperatures which can range from about 500° C., more preferably at least about 800° C., up to about 3200° C. to prepare carbon foams useful for the formation of laminate sandwiches which can be employed as decking for naval vessels.

The foam is employed as the core in a laminate comprising the foam core having opposing top and bottom major surfaces. A plurality of discrete pins is disposed through the core and extends beyond the major surfaces of the core. Indeed, the nature of the foam described above makes it particularly useful in the regard, since disposing the pins through the foam will not cause cracking or other damage to the structural integrity of the foam, as it will with other materials, such as wood, etc.

A facesheet is positioned on each of the major surfaces of the foam core, and the ends of each pin is bent over so as to lie between the respective major surfaces of the foam and the facesheets. Each pin may include strands of fiber and the strands of fiber are separated from each other at the extending bent over ends of each pin. The pins may also be wires.

The facesheets employed are preferably composites which are formed of an array of fibers in a resin matrix. The array of fibers can then form a fabric. For instance, a carbon-carbon composite material can be used as one or both facesheets of the inventive laminate sandwich. The face sheet material could also be a dry fabric such as fiberglass before it is impregnated with resin or a pre-impregnated material. Alternatively, each face sheet can be formed of a metal.

The laminate is formed such that the pins are preferably disposed at an angle in the foam core, thusly forming a truss structure therein. Each pin may be angled differently from adjacent pins. In one preferred embodiment of the invention, the bent over ends of the pins may form a repeating pattern of sets of pin ends along the top and bottom major surfaces of the foam. The pins are usually discrete and do not join with adjacent pins.

The present invention also comprises a method of manufacturing the inventive laminate, comprising providing a monolithic foam having two major surfaces and having a ratio of strength to density of at least about 7000 psi/g/cc, more preferably at least about 8000 psi/g/cc; disposing a plurality of pins through the foam core such that the ends of the pins extend from the major surfaces of the foam; bending the extending ends of the pins over to lie on the surfaces of the core; and assembling facesheets on the core and over the bent over pins.

The step of bending the pins may include subjecting the pins to heat and pressure by placing the core/pin combination in a hot press. The step of assembling the facesheets includes laying a preimpregnated (typically referred to as prepreg) layer on the foam over the bent pin ends and curing the prepreg layer. Alternatively, the step of assembling the facesheets includes laying a dry fabric layer on the core over the bent pin ends, impregnating the dry fabric layer with resin, and curing the resin.

Disposing the pins through the foam core can be by any method suitable for forcing an object such as a pin through a material like carbon foam. This preferably includes inserting the pins at an angle in the core to form a truss structure in the foam core. Inserting the pins may include orienting each pin at an angle different than the angle of each adjacent pin, and also typically includes forming a repeating pattern of pin end sets; each pin, in each set of pin ends on one surface of the core extending to a different set of pin ends on the other surface of the core. Advantageously, the pin ends of each set of pin ends are bent in a different direction. This invention also features the product made by this method.

The step of inserting the pins includes disposing the pins at an angle in the core forming a truss structure therein. The angle of each pin is preferably different from the angle from each adjacent pin. The method may include forming a repeating pattern of sets of pin ends, each pin end in each set of pin ends on one surface of the core extending to a different set of pin ends on the other surface of the core. The pin ends of each set of pin ends are preferably bent in a different direction.

In another embodiment, a plurality of pins are inserted through a carbon foam core such that the ends of the pins extend from the core; face sheet material is assembled on the foam core such that the extending pin ends pierce through the face sheet material; and the extending pin ends are bent over the face sheet material. The face sheet material may be a prepreg or dry fabric which has yet to be impregnated with a resin. The step of inserting the pins typically includes disposing the pins at an angle in the core forming a truss structure therein wherein the angle of each pin is different from the angle of each adjacent pin. In addition, the step of inserting the pins can include forming a repeating pattern of sets of pin ends, each pin end in each set of pin ends on one surface of the core extending to a different set of pin ends on the other surface of the core. Preferably, the pin ends of each set of pin ends are bent in different directions.

An object of the invention, therefore, is a laminate sandwich including a monolithic carbon foam having characteristics which enable the laminate sandwich to be employed in high strength applications such as decking for naval vessels.

Another object of the invention is a carbon foam having the density, compressive strength and ratio of compressive strength to density sufficient for the formation of laminate sandwiches useful for applications such as decking for naval vessels.

Still another object of the invention is a laminate sandwich including a carbon foam having a porosity and cell structure and distribution to provide utility in applications where highly connected porosity is undesirable.

Yet another object of the invention is a carbon foam-core laminate which can be produced in a desired size and configuration, and which can be readily machined or joined to provide larger structures.

Another object of the invention is to provide a method of producing the inventive laminate sandwich.

These aspects and others that will become apparent to the artisan upon review of the following description can be accomplished by providing a laminate sandwich having as its core a carbon foam article formed of a carbon foam having a ratio of compressive strength to density of at least about 7000 psi/g/cc, especially a ratio of compressive strength to density of at least about 8000 psi/g/cc. The carbon foam advantageously has a density of from about 0.05 to about 0.4 and a compressive strength of at least about 2000 psi, and a porosity of between about 65% and about 95%. The pores of the carbon foam have, on average, an aspect ratio of between about 1.0 and about 1.5.

Preferably, at least about 90% of the pore volume of the pores has a diameter of between about 10 and about 150 microns; indeed, most preferably at least about 95% of the pore volume of the pores has a diameter of between about 25 and about 95 microns. Advantageously, at least about 1% of the pore volume of the pores has a diameter of between about 0.8 and about 3.5 microns, more preferably, from about 2% to about 10% of the pore volume of the pores has a diameter of about 1 to about 2 microns.

The foam can be produced by carbonizing a polymer foam article, especially a phenolic foam, in an inert or air-excluded atmosphere. The phenolic foam should preferably have a compressive strength of at least about 100 psi.

The inventive laminate sandwich includes the carbon foam as a core having opposing top and bottom major surfaces; a plurality of discrete pins disposed through the carbon foam core and extending beyond the major surfaces of the core; a face sheet on one of the major surfaces of the carbon foam core; and a face sheet on the second of the major surfaces of the carbon foam core, the ends of each pin bent over and lying between the respective core surfaces and the facesheets.

Other and further objects, features, and advantages of the present invention will be readily apparent to those skilled in the art, upon a reading of the following disclosure when taken in conjunction with the accompanying drawings.

DETAILED DESCRIPTION OF THE PREFERRED EMBODIMENTS

Figure 1:
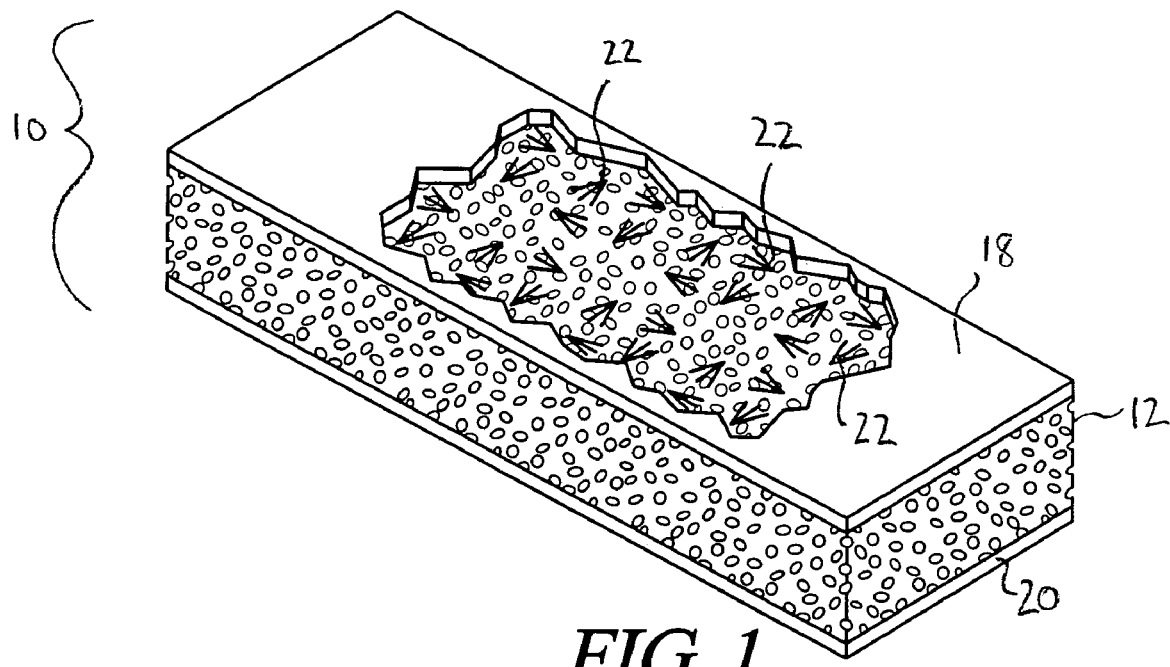
FIG. 1 is a partially broken away top perspective view of the laminate sandwich of the present invention.

Carbon foams in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resoles catalyzed by sodium hydroxide at a formaldehyde:phenol ratio which can vary, but is preferably about 2:1. Free phenol and formaldehyde content should be low, although urea may be used as a formaldehyde scavenger.

The foam is prepared by adjusting the water content of the resin and adding a surfactant (e.g., an ethoxylated nonionic), a blowing agent (e.g., pentane, methylene chloride, or chlorofluorocarbon), and a catalyst (e.g., toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p.p'-dihydroxydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the inventive carbon foam should have an initial density which mirrors the desired final density for the carbon foam which is to be formed. In other words, the polymeric foam should have a density of about 0.1 to about 0.6 g/cc, more preferably about 0.1 to about 0.4 g/cc. The cell structure of the polymeric foam should be closed with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density of at least about 7000 psi/g/cc, more preferably at least about 8000 psi/g/cc. The carbon foam has a relatively uniform distribution of isotropic pores having, on average, an aspect ratio of between about 1.0 and about 1.5.

The resulting carbon foam has a total porosity of about 65% to about 95%, more preferably about 70% to about 95% with a bimodal pore distribution; at least about 90%, more preferably at least about 95%, of the pore volume of the pores are about 10 to about 150 microns in diameter, more preferably about 15 to about 95 microns in diameter, most preferably about 25 to about 95 microns in diameter, while at least about 1%, more preferably about 2% to about 10%, of the pore volume of the pores are about 0.8 to about 3.5 microns, more preferably about 1 to about 2 microns, in diameter. The bimodal nature of the foam provides an intermediate structure between open-celled foams and closed-cell foams, limiting the liquid permeability of the foam while maintaining a foam structure. Permeabilities less than 3.0 darcys, even less than 2.0 darcys, are preferred.

Typically, characteristics such as porosity and individual pore size and shape are measured optically, such as by use of an epoxy microscopy mount using bright field illumination, and are determined using commercially available software, such as Image-Pro Software available from Media-Cybernetic of Silver Springs, Md.

In order to further illustrate the principles and operation of the present invention, the following example is provided. However, this example should not be taken as limiting in any regard.

EXAMPLE

A rectangular phenolic foam block with dimensions of 7.8 inches long, 3.9 inches wide and 2.9 inches thick is converted to carbon foam in the following manner. The starting phenolic foam has a density of 0.32 g/cc, and a compressive strength of about 300 psi. The foam is packed in a steel can, protected from air and then heated at 2° C. per hour to a temperature of 550° C. and then at 10° C. per hour to 900° C. and held for about 20 hours at that temperature. The resultant carbon foam obtained has a density of 0.336 g/cc and a compressive strength of 4206 psi, for a strength to density ratio of 12,517 psi/gm/cc. The thermal conductivity of the foam is measured as 0.3 W/m° K at 25° C. and the permeability is measured as 0.17 darcys.

The foam was examined by optical microscopy and the porosity of the foam is measured as 79.5%. Two sets of pores are observed, and the pores appear round with fairly uniform diameters. An image analysis procedure is used to determine the average diameters and aspect ratios of the two different sets of pores. For the large size pores, with diameters above 25 microns, the calculated average diameter is 35 microns with a standard deviation of 24 microns. The pore aspect ratio is calculated as 1.16 showing they are essentially spherical. These large pores account for 96% of the pore volume of the total porosity. The finer size pores, which account for 4% of the pore volume of the total porosity, have an average diameter of 1.75 microns with a standard deviation of 0.35. The aspect ratio of these pores is measured as 1.10.

The pore structure of the foam is unique as compared to other foams in that it appears intermediate to a closed cell and open cell configuration. The large pores appear to be only weakly connected to each other by the fine porosity so that the foam exhibits permeability in the presence of water but does not readily absorb more viscous liquids.

A series of carbon foams is produced by using different density precursor materials. The properties of the products are listed below;

|  | Foam 1 | Foam 2 | Foam 3 |
| --- | --- | --- | --- |
| Density g/cc | 0.266 | 0.366 | 0.566 |
| Compressive Strength (psi) | 2263 | 4206 | 8992 |
| Compressive Strength/Density | 8,507 | 12,517 | 16,713 |

Figure 2:
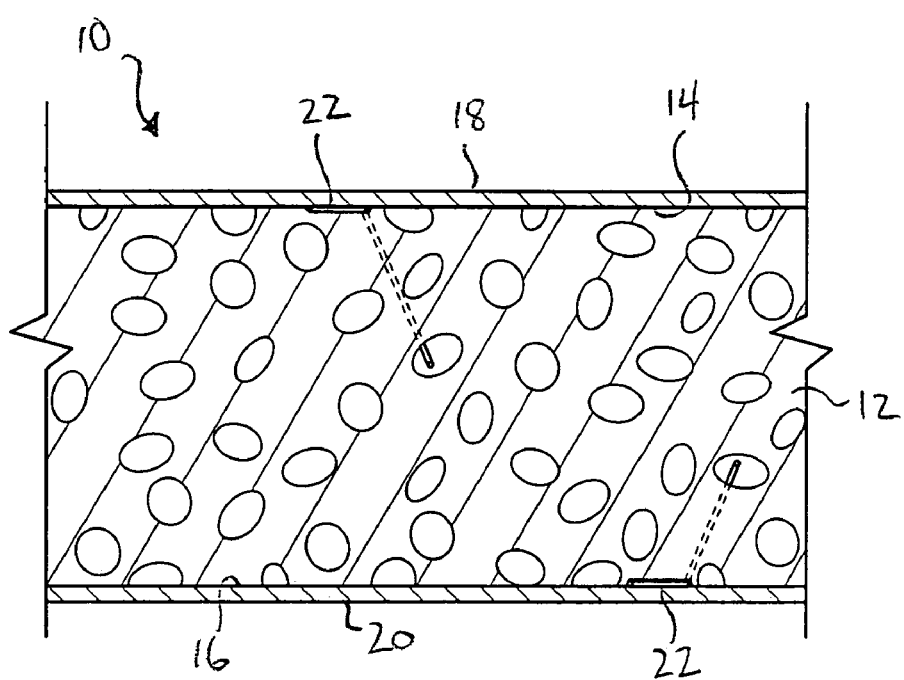
FIG. 2 is a partial cross-sectional view of the laminate sandwich of FIG. 1, showing two of the pins partially in phantom.

Referring now to FIGS. 1 and 2 the thusly-prepared carbon foam can then be incorporated into a laminate structure 10 which may be used in the manufacture of decking for naval vessels and a variety of structures used in military and aerospace applications, as well as for boat hulls, skis, riser plates for skis, snow boards, and other structures. In general, laminate 10 can be used anywhere honeycomb laminates, or other laminates including wood, foam or other cores are currently used.

Laminate 10 includes a carbon foam core 12 having opposing major surfaces 14 and 16. As noted, core 12 is made out of carbon foam having a compressive strength of at least about 2000 psi and, significantly, a ratio of strength to density of at least about 7000 psi/g/cc, more preferably at least about 8000 psi/g/cc. The suitable carbon foam has a relatively uniform distribution of isotropic pores having, on average, an aspect ratio of between about 1.0 and about 1.5. The suitable carbon foam must have characteristics which allow penetration of pins and provide sufficient lateral support to the pins to prevent them from buckling.

On surfaces 14 and 16 of carbon foam core 12 are facesheets 18 and 20. Facesheets 18 and 20 may be composite structures including an array of fibers in a resin matrix, such as a prepreg material which is cured during fabrication or a layer of fabric which must be resin impregnated and then cured. Alternatively, sheets 18 or 20 may be metal, a metal alloy, or some other unitary material depending on the specific implementation.

A plurality of discrete pins 22 extend between major surfaces 14 and 16 of core 12, with each end of each pin 22 extending from surface 14 of core 12 and bent over and lying between core 12 and facesheets 18 or 20, as shown. The other end of each pin 22 is similarly bent over along opposing major surface 16 of core 12. Thus, the pattern shown in FIG. 1 is repeated on the bottom side of structure 10, in the orientation of laminate 10 shown in FIGS. 1 and 2.

As illustrated in FIG. 1, each pin 22 can be formed of fiber bundles which include strands of fibers surrounded by a cured resin. When the ends of pins 22 are bent over under sufficient heat and pressure, the individual fibers are exposed and splay out on major surfaces 14 and 16 of core 12, as illustrated in FIG. 1.

In a preferred embodiment, facesheets 18 and 20 are then laid on core surfaces 14 and 16 over the exposed, splayed out, bent over ends of pins 22. After this structure is then cured, pins 22 join facesheets 18 and 20 to core 12, since pins 22 extend from one facesheet to the other and become adhered or fused to each facesheet 18 and 20. Resin from facesheets 18 and 20 attaches itself to the exposed individual fibers of each pin 22 and may even seep down along the length of each pin 22. Examples of other fibrous pins includes pins made of Kevlar or E-glass. The use of fibrous pins, however, is not required; pins made out of wire or other materials may also be used. Examples of other fibrous pins includes pins made of Kevlar or E-glass.

Pins 22 reinforce foam core 12 by forming a truss structure therein which greatly increases the shear, compressive, and fatigue strength of laminate 10. In order to form an optimal truss structure within foam core 12, pins 22 are preferably disposed at an angle of, for instance, between about 20° and 40° to normal as shown in FIG. 2. This structure also allows for the end of each pin 22 to be bent one way on surface 14 of foam core 12 and to be bent the opposite way on surface 16 of core 12, which adds to the strength of laminate 10.

Accordingly, by the practice of the present invention, a laminate 10 having a carbon foam core 12 having heretofore unrecognized characteristics are prepared. These laminates exhibit exceptionally high resistance to shear forces and extraordinary compressive strength to density ratios, making them uniquely effective at applications, such as decking for naval vessels.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A laminate sandwich structure comprising a core which comprises carbon foam having two opposed major surfaces and a ratio of compressive strength to density of at least about 7000 psi/g/cc, wherein at least about 90% of the pore volume of the pores of the carbon foam has a diameter of between about 10 and about 150 microns and at least about 1% of the pore volume of the pores has a diameter of between about 0.8 and about 3.5 microns.

2. The structure of claim 1 which further comprises a plurality of pins disposed through the core.

3. The structure of claim 2 which further comprises a facesheet positioned on at least one of the major surfaces of the core.

4. The structure of claim 3 wherein the facesheet comprises a composite formed of an array of fibers in a resin matrix.

5. The structure of claim 3 wherein the ends of a plurality of the pins is bent over so as to lie between the respective major surfaces of the core and a facesheet.

6. The structure of claim 1 wherein the carbon foam has a ratio of compressive strength to density of at least about 8000 psi/g/cc.

7. The structure of claim 6 wherein the carbon foam has a density of from about 0.05 to about 0.4 and a compressive strength of at least about 2000 psi.

8. The structure of claim 7 wherein the carbon foam has a porosity of between about 65% and about 95%.

9. The structure of claim 8 wherein the pores of the carbon foam have, on average, an aspect ratio of between about 1.0 and about 1.5.

10. The structure of claim 1 wherein at least about 95% of the pore volume of the pores has a diameter of between about 25 and about 95 microns.

11. The structure of claim 1 wherein from about 2% to about 10% of the pore volume of the pores has a diameter of about 1 to about 2 microns.

12. The structure of claim 1 wherein the foam has a permeability of no greater than about 3.0 darcys.

13. A laminate sandwich structure comprising a carbon foam core having two opposed major surfaces and having a pore distribution such that at least about 90% of the pore volume of the pores has a diameter of between about 10 and about 150 microns and at least about 1% of the pore volume of the pores has a diameter of between about 0.8 and about 3.5 microns, wherein the structure further comprises a facesheet positioned on at least one of the major surfaces of the core.

14. The structure of claim 13 which further comprises a plurality of pins disposed through the core.

15. The structure of claim 13 wherein the facesheet comprises a composite formed of an array of fibers in a resin matrix.

16. The structure of claim 13 wherein the ends of a plurality of the pins is bent over so as to lie between the respective major surfaces of the core and a facesheet.

17. The structure of claim 13 wherein at least about 95% of the pore volume of the pores of the foam has a diameter of between about 25 and about 95 microns.

18. The structure of claim 17 wherein from about 2% to about 10% of the pore volume of the pores has a diameter of about 1 to about 2 microns.

19. The structure of claim 13 wherein the carbon foam has a ratio of compressive strength to density of at least about 7000 psi/g/cc.

20. The structure of claim 19 wherein the carbon foam has a ratio of compressive strength to density of at least about 8000 psi/g/cc.

21. The structure of claim 20 wherein the carbon foam has a density of from about 0.05 to about 0.4 and a compressive strength of at least about 2000 psi.

22. The structure of claim 13 wherein the carbon foam has a porosity of between about 65% and about 95%.

23. The structure of claim 22 wherein the pores of the carbon foam have, on average, an aspect ratio of between about 1.0 and about 1.5.

24. The structure of claim 13 wherein the carbon foam has a permeability of no greater than about 3.0 darcys.

* * * * *